United States Patent
Black et al.

(10) Patent No.: US 10,801,267 B1
(45) Date of Patent: Oct. 13, 2020

(54) DRILL FOR CHARACTERIZATION OF MATERIALS

(71) Applicant: Intelligent Fiber Optic Systems, Inc., Santa Clara, CA (US)

(72) Inventors: Richard J. Black, Menlo Park, CA (US); Behzad Moslehi, Los Altos, CA (US)

(73) Assignee: Intelligent Fiber Optic Systems, Inc., San Jose, CA (US)

( * ) Notice: Subject to any disclaimer, the term of this patent is extended or adjusted under 35 U.S.C. 154(b) by 167 days.

(21) Appl. No.: 16/004,108

(22) Filed: Jun. 8, 2018

Related U.S. Application Data

(60) Provisional application No. 62/517,144, filed on Jun. 8, 2017.

(51) Int. Cl.
| | |
|---|---|
| *E21B 10/48* | (2006.01) |
| *G01L 1/24* | (2006.01) |
| *E21B 41/00* | (2006.01) |
| *G01L 1/10* | (2006.01) |
| *G01L 5/12* | (2006.01) |
| *E21B 10/44* | (2006.01) |

(52) U.S. Cl.
CPC .............. *E21B 10/48* (2013.01); *E21B 10/44* (2013.01); *E21B 41/00* (2013.01); *G01L 1/10* (2013.01); *G01L 1/246* (2013.01); *G01L 5/12* (2013.01)

(58) Field of Classification Search
CPC .......... E21B 10/48; E21B 10/44; E21B 41/00; G01L 1/10; G01L 1/246; G01L 5/12
See application file for complete search history.

(56) References Cited

U.S. PATENT DOCUMENTS

| | | | |
|---|---|---|---|
| 2008/0118214 A1* | 5/2008 | Chen | G01B 11/18 385/128 |
| 2012/0143521 A1* | 6/2012 | Chen | G01L 1/246 702/42 |
| 2015/0177411 A1* | 6/2015 | Childers | G01L 1/246 250/269.1 |
| 2016/0024912 A1* | 1/2016 | Gajji | E21B 47/06 340/854.7 |
| 2018/0266947 A1* | 9/2018 | Coonrod | G01D 5/35316 |

* cited by examiner

*Primary Examiner* — Yong-Suk Ro
(74) *Attorney, Agent, or Firm* — File-EE-Patents.com; Jay A. Chesavage

(57) ABSTRACT

A drill has a stationary drive mechanism coupled to a rotating drill, the rotating drill having a serpentine optical fiber positioned on an inner shell having a serpentine groove with fiber Bragg gratings (FBGs) coupled to the inner shell and arranged parallel to the central axis of rotation for measurement of axial forces and also positioned circumferentially for measurement of drill torque. The FBGs are arranged on a single optical fiber and coupled to a broadband optical source such that reflected optical energy is directed to an interrogator for estimate of strain at each FBG. The FBG responses may also be examined dynamically to estimate material hardness during a drilling operation.

16 Claims, 3 Drawing Sheets

Drill Assembly Front View

Drill Assembly Section B-B

Drill subassy

Spindle

Inner Shell

Inner Shell

DRILL FOR CHARACTERIZATION OF MATERIALS

The present invention was developed under U.S. grant NNX 16CK03P awarded by the National Aeronautics and Space Administration (NASA). The government has certain rights in this invention.

FIELD OF THE INVENTION

The present invention relates to a drill which characterizes materials during a drilling or boring operation. In particular, the invention relates to a drill with an inner shell having serpentine grooves with fiber-optic Bragg grating sensors for characterization of a material being drilled using static and dynamic strain patterns during the boring operation.

BACKGROUND OF THE INVENTION

Characterization of material is typically done as a secondary operation, where after drilling or boring, the drilled material is removed and examined. In certain environmental conditions, this is not practical, and it is preferred to perform the characterization during the drilling operation itself.

OBJECTS OF THE INVENTION

A first object of the invention is a rotating drill having external helical features for removal of drilled debris and also internal sensing surfaces which include a groove for the placement of an optical fiber having fiber Bragg gratings (FBG) for the sensing of strain (static and dynamic/vibration) and/or temperature in the FBGs during the drilling operation and/or chemical parameters through chemically coated FBGs.

A second object of the invention is a drill comprising a cylinder with abrasive material on a cutting surface such as at the circular end of the cylinder opposite the drive shaft, grooves located on the inner or outer surface of the cylinder for disposition of an optical fiber having FBGs, the groove and FBGs positioned to measure a rotational force/torque (e.g., with a 45 degree oriented FBG) and an axial force (parallel to the drill axis).

A third object of the invention is a drill having a rotational cutting surface and an insert which includes a measurement surface, the measurement surface including a groove in the insert for disposition of an optical fiber, the optical fiber having FBGs which are positioned in locations which provide at least one of: an axial strain measurement, a torque measurement, or a dynamic measurement of vibration of the boring bit which may be used to infer a hardness or material which is being drilled.

A fourth object of the invention is a drill having a cutting end and a driven end, the drill having an optical fiber disposed to perform spectrographic analysis of material being drilled at the cutting end.

SUMMARY OF THE INVENTION

A drill has a drive shaft and a cylindrical shell about an axis, the cylindrical shell having a driven end and a cutting end, the cutting end being either open or closed, the shell including an optical fiber having a plurality of fiber Bragg gratings (FBG) for the measurement of torque and pressure. In one example, the drill shell includes one or more grooves for the placement of an optical fiber, at least one FBG disposed in the one or more grooves having a segment which is in a plane which is perpendicular to the to the axis for measurement of rotational force or torque, such as a circumferential segment, and at least one FBG disposed in a groove in the shell which is parallel to the axis for measurement of axial force developed on the cylindrical shell. The groove may be formed in a continuous serpentine path which has segments perpendicular to the central axis and also circumferential to the central axis, with the FBGs each operative in a unique range of wavelengths for the simultaneous measurement of a plurality of forces, torques, temperatures, and/or chemical measurand. Alternatively, the FBG sensor segment may be helically placed on the cylindrical shell, thereby coupling both axial force and rotational torque.

DETAILED DESCRIPTION OF THE INVENTION

Figure 1:
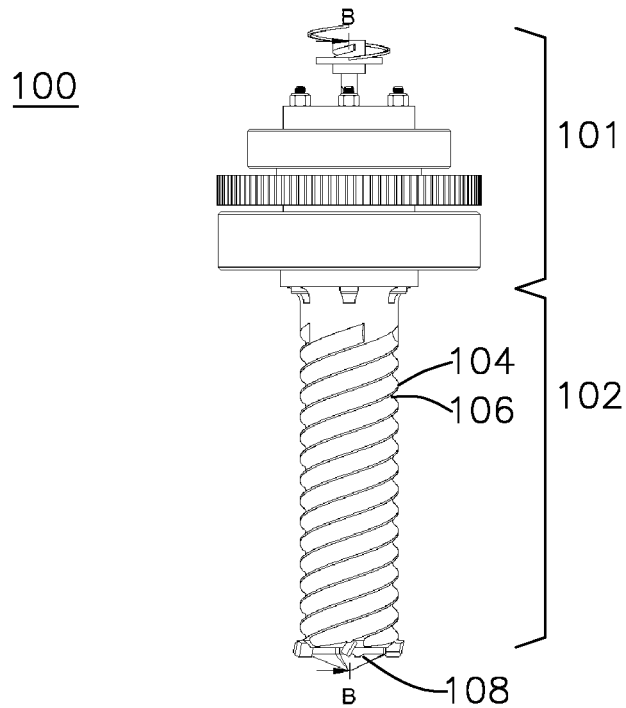
FIG. 1 shows a drill assembly front view.

FIG. 1 shows a front view of a drill assembly 100. A drive mechanism 101 is secured to a non-rotating structure, and causes the shaft region 102 to rotate while the end 108 is driven into the material to be characterized. The external surface of the drill body may have helical grooves 106 formed in the outer surface 104 to provide for the movement of drilled material away from the end 108. The end 108 may include an aperture for exposure of the drilled material to spectroscopic analysis.

Figure 2:
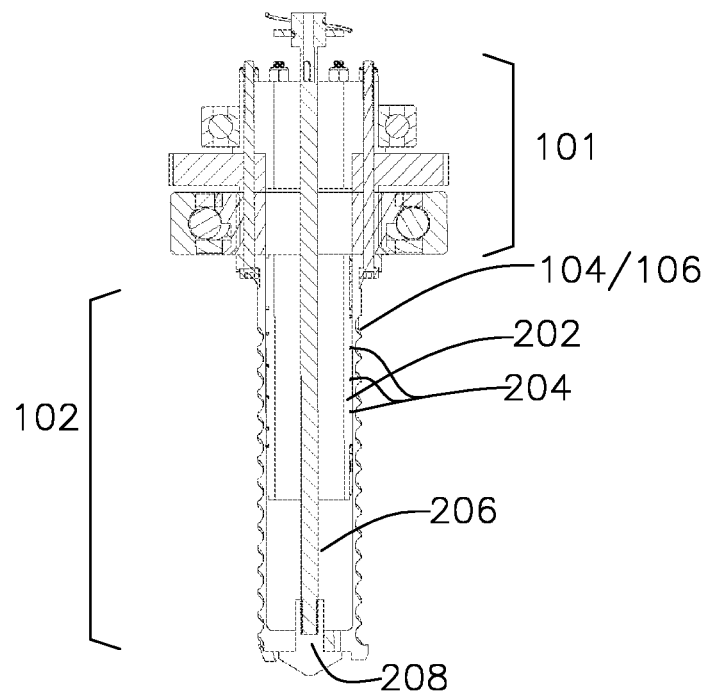
FIG. 2 shows a section view of FIG. 1.

FIG. 2 shows a cross section view of the drill, showing the outer shell helical material removal groove and body 104/106. An inner spindle 206 may carry an optical fiber from the driven end of the drill to an aperture for spectrographic examination of the drilled material. Inner shell 202 is mechanically coupled to the outer shell 104/106, and the inner shell 202 also includes a groove with optical fiber and FBGs disposed in the groove and secured to the inner shell 202 to communicate strains in the inner shell to the sensing unit (not shown). The optical fiber includes a rotating optical coupler as part of the drive mechanism 101 to provide continuous coupling of optical energy from an optical source as well as reflections from the FBGs to the wavelength interrogator, the optical energy coupled to the FBGs and reflections from sensing fiber FBGs positioned into the grooves 204 of inner shell 202.

Figure 3A:
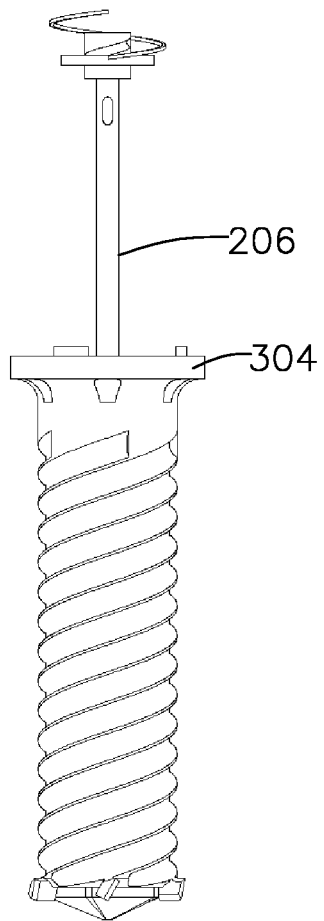
FIG. 3A shows an exploded view of a drill.
Figure 3B:
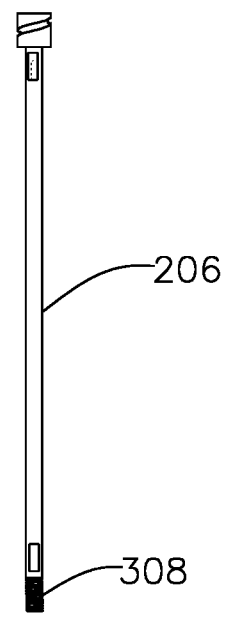
FIG. 3B shows a front view of a spindle of the drill.

FIG. 3A shows an exploded view of the drill subassembly, including spindle 206, outer shell 304, and inner shell 204 (not shown) which is enclosed within outer shell 304. FIG. 3B shows the spindle 206 including threaded end 308, which may rotate about a central axis. The outer shell 304 may be formed from steel, or any other suitable material for drilling, and may include carbide, diamond, or other materials with enhanced hardness positioned on the cutting surface.

Figure 3C:
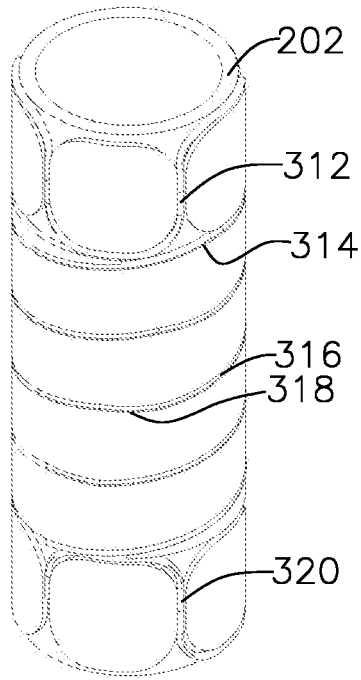
FIG. 3C shows a front view of an outer shell of the drill.
Figure 3D:
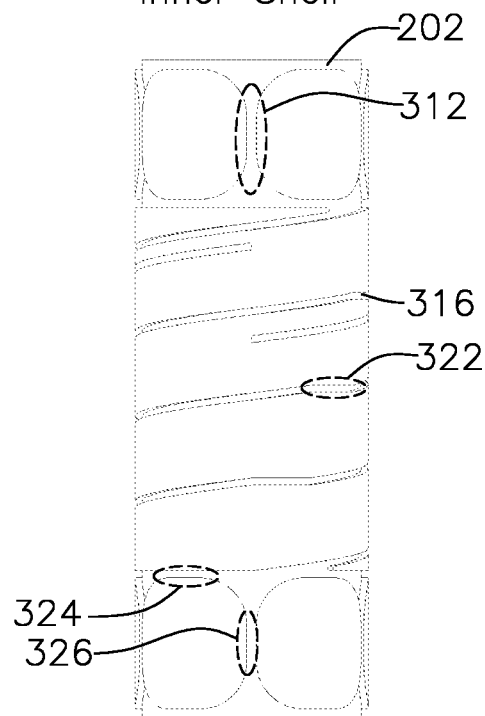
FIG. 3D show a perspective view of an inner shell of the drill.

FIG. 3C shows an inner shell 202 formed from a material such as steel, which includes a serpentine groove sufficient for securing an optical fiber with FBGs, as was described. The optical fiber is preferably a single mode or few mode optical fiber with a plurality of FBGs formed along its length, each FBG operative at a unique wavelength and coupled either to a rotational strain, such as in region 318 which lies circumferentially in a plane which is perpendicular to the central axis, thereby coupling rotational stress into an FBG which is circumferential to the rotation, and other FBGs are positioned in regions 320, 312, and 326 which are parallel to the axis of rotation, as also shown in FIG. 3D which provides perspective of the grooves 316. The FBGs may be secured to the associated sensing regions using an epoxy with a thermal coefficient of expansion (TCE) which matches the TCE of the inner shell 202 and serpentine groove which supports them. Some FBGs may be positioned in the inner shell 202 without mechanical coupling to the inner shell 202 for the purpose of temperature measurement without the influence of strain, which may be used to compensate the measurements made on strain sensors coupled to the inner shell 202.

The drill section 102 of FIG. 1 may be open on tip end 108 for taking a core sample, with the outer wall of the drill smooth rather than having the helical grooves 104/106 as shown. In this embodiment, the cutting edge of the drill is the circular lower region, which may be coated with an abrasive. Alternatively, the embodiment of FIG. 1 which includes direct optical fiber illumination and return of optical signal for spectrographic measurement may be performed.

In another embodiment, the FBGs are chemically coated such that the coating induces a strain within the FBG in proportion to the chemical reaction. In one example, the FBG is coated with palladium and the sensor is used to monitor hydrogen production. Palladium absorbs hydrogen, so as the level of hydrogen in the outside environment increases, the Palladium expands causing a strain on the fiber. This process is reversible so as hydrogen leaves the air, the Palladium degasses and the fiber Bragg Grating then returns to its normal shape. The FBG can be coated with other types of reactive material that will react only to the chemical in question. This is especially applicable in cases of bio agents where the absorption of the bio agent by the coating on the FBG would cause the grating to expand in proportion to its absorption of the bio agent. It is also possible that the absorption of the bio agent by the coating on the FBG would cause a change in the index of refraction of the fiber Bragg grating which could then be determined by the measuring instrument. In another embodiment of the invention, chemical sensors are formed by coating the FBG with the glassy polymer cellulose acetate (CA). CA is a polymeric matrix capable of localizing or concentrating chemical constituents within its structure. Some typical properties of CA include good rigidity (high modulus) and high transparency. With CA acting as a sensor element, immersion of the gratings in various chemical solutions causes the polymer to expand and mechanically strain the glass fiber. This elongation of the fiber sections containing the grating causes a corresponding change in the periodicity of the grating that subsequently results in a change in the Bragg-reflected wavelengths. A high-resolution tunable fiber ring laser interrogator may then be used to obtain room-temperature reflectance spectrograms from two fiber gratings at two different wavelengths—1540 nm and 1550 nm. The display of spectral shape, rather than shifts in FBG reflected central wavelength allows for more comprehensive analysis of how different physical conditions cause the reflectance profile to move and alter overall form. Shifts on the order of 1 to 80 pm in the FBG central wavelength and changes in spectral shape are observed in both sensors upon immersion in a diverse selection of chemical analytes. The FBGs with this capability may be combined with the FBGs of sensor string 412 of FIG. 4.

Figure 4:
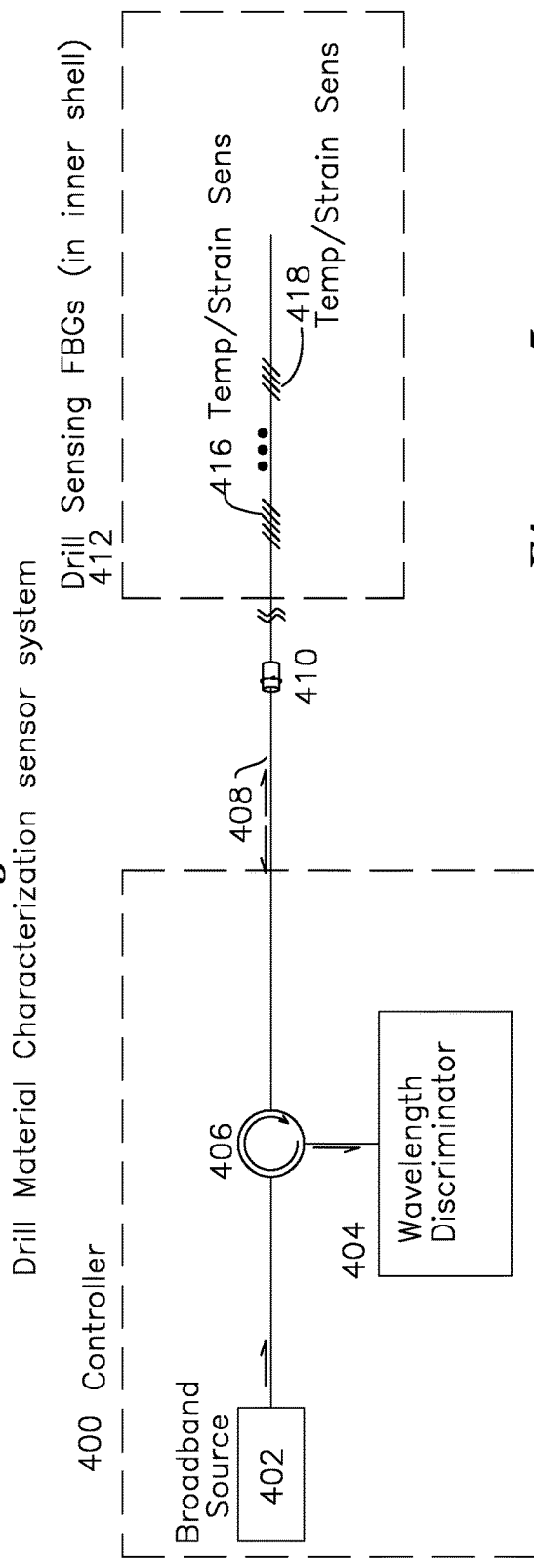
FIG. 4 shows a block diagram of a controller and drill sensing FBGs.

FIG. 4 shows an exemplar drill material characterization system, comprising a controller 400 coupled to drill sensing FBGs 412 via optical fiber 408 and rotational coupler 410. Broadband source 402 generates a range of wavelengths which cover the non-overlapping wavelength extents of each of the FBG sensors of the system, shown for brevity as FBG 416 and 418, although it is possible to measure strain in many hundreds of FBGs formed along the single optical fiber. Each FBG 416 through 418 is operative in a narrow range of wavelengths, and reflects optical energy from broadband source 402 which has been coupled through optical circulator 406. The reflected optical energy from each FBG sensor 416 to 418 is directed through rotational coupler 410 and fiber 408 to directional coupler 406, where the optical energy is directed to wavelength discriminator 404, which comprises a plurality of optical sensors, one for each FBG. Example wavelength interrogators may be found described in U.S. Pat. No. 9,110,259, 8,983,250, 6,895,132, 6,788,835, 6,788,835, or 6,597,822 by the present assignee, which are all incorporated by reference.

Figure 5:
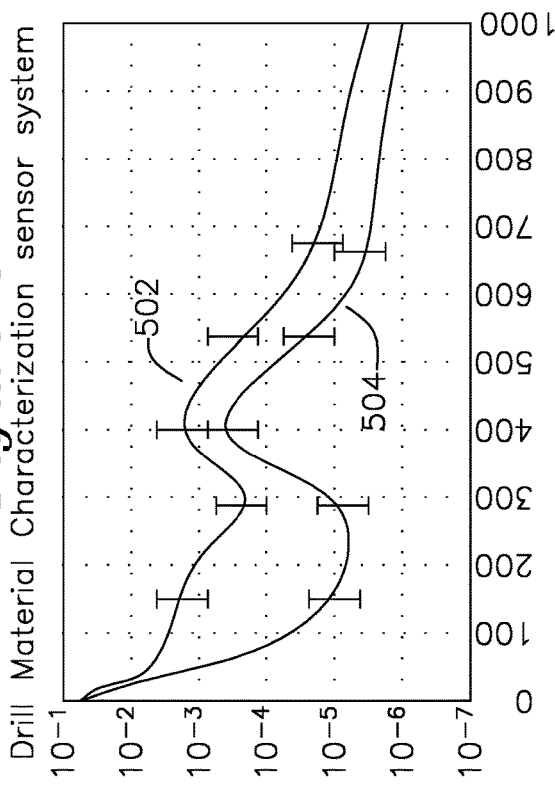
FIG. 5 shows plots of dynamic characteristics of FBG sensor measurements for estimation of material hardness during a drilling operation.

FIG. 5 shows plots which demonstrate an additional feature of the present invention, whereby the inner and outer shell may exhibit dynamic vibrational characteristics, which may be used to make correlations to various drilled material hardness by vibrational characteristics. Plot 402 shows a dynamic vibrational characteristic expressed as amplitude vs frequency for drilling through a hard material such as concrete, and plot 404 is the same plot for drilling through a comparatively softer material such as plaster. The frequency response peak for both curves near 0 Hz is due to the low frequency drill rotation rate, in this case approximately 15 Hz. Motor vibrations are responsible for the peak of both plots in the range of 400 Hz. The frequency range from approximately 50 Hz to 350 Hz and above 450 Hz may be used for characterization of the material being drilled, as it can be seen that the amplitude range (as indicated by the range bars) is indicative of material softness or hardness.

We claim:

1. A drill comprising:
   a shaft having a central axis of rotation;
   a cylinder coupled to the shaft having abrasive material on a cutting surface;
   the cylinder also having grooves located on a surface, the grooves supporting an optical fiber, the optical fiber having a plurality of fiber Bragg gratings (FBGs) disposed in said optical fiber;
   at least one single FBG positioned in a helical segment of the groove in the cylinder to measure a rotational force and an axial force of the shaft;
   and where the end of said cylinder includes an aperture, said aperture conveying an optical fiber coupled to an illumination source for coupling optical energy out of said aperture and an optical fiber for coupling reflected optical energy into said aperture to measure a reflected spectrum of a material proximal to said aperture.

2. The drill of claim 1 where one of said plurality of FBGs is positioned circumferentially about said central axis of rotation for measurement of a rotational force.

3. The drill of claim 1 where one of said plurality of FBGs is positioned parallel to the central axis to measure an axial force on the cylinder.

4. The drill of claim 1 where said abrasive material is on a circular edge of said cylinder perpendicular to said central axis.

5. The drill of claim 1 where said grooves and said FBGs are positioned on an inner surface of said cylinder.

6. The drill of claim 1 where said cylinder has features on an outside surface for removal of drilled material.

7. The drill of claim 6 where said features are helical grooves.

8. The drill of claim 1 where at least one of said plurality of FBGs measures a vibration amplitude for estimation of hardness of a drilled material.

9. The drill of claim 1 where said optical fiber is coupled to said cylinder through a rotational coupler.

10. The drill of claim 1 where each said FBG operates in a unique wavelength from other FBGs.

11. A drill comprising:
- a central shaft operative to rotate about an axis;
- a cylinder having an end with a cylindrical cutting surface, the cylinder coupled to the central shaft;
- the cylinder having a plurality of grooves on an inner surface, said groove having an optical fiber secured to said groove, said optical fiber having at least one fiber Bragg grating (FBG) sensor;
- where at least one said FBG sensor is coupled to estimate a rotational strain of the cylinder;
- and where the end of said cylinder includes an aperture, said aperture conveying an optical fiber coupled to an illumination source for coupling optical energy out of said aperture and an optical fiber for coupling reflected optical energy into said aperture to measure a reflected spectrum of a material proximal to said aperture.

12. The drill of claim 11 where at least one said FBG sensor is positioned circumferentially on said cylinder to estimate said rotational strain.

13. The drill of claim 11 where at least one said FBG sensor is positioned axially on said cylinder to estimate said axial strain or said vibration.

14. The drill of claim 11 where at least one said FBG sensor is coated with a chemical which induces a strain in the presence of a gas to be detected to estimate the presence of the gas to be detected.

15. The drill of claim 11 where said chemical coating is at least one of: palladium or glassy polymer cellulose acetate (CA).

16. A drill comprising:
- a shaft having a central axis of rotation;
- a cylinder coupled to the shaft having abrasive material on a cutting surface of the cylinder;
- the cylinder having grooves located on an outer surface of the cylinder for removal of drilled material;
- the cylinder having an aperture coupling optical energy to a material being drilled, the aperture having a first optical fiber coupled to an optical source and directing optical energy out of the aperture, and a second optical fiber coupled to reflected optical energy and conveying the reflected optical energy to a spectrometer for measurement of reflected optical spectra;
- a rotating optical coupler between the optical fiber coupled to the spectrometer and optical fiber coupled to the optical source.

* * * * *